(12) United States Patent
Ohtani et al.

(10) Patent No.: US 7,782,037 B2
(45) Date of Patent: Aug. 24, 2010

(54) POWER CONVERSION CIRCUIT

(75) Inventors: Hiroki Ohtani, Aichi-gun (JP); Masaki Okamura, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 251 days.

(21) Appl. No.: 12/087,675

(22) PCT Filed: Aug. 2, 2007

(86) PCT No.: PCT/JP2007/065569

§ 371 (c)(1),
(2), (4) Date: Jul. 11, 2008

(87) PCT Pub. No.: WO2008/018523

PCT Pub. Date: Feb. 14, 2008

(65) Prior Publication Data

US 2009/0001925 A1 Jan. 1, 2009

(30) Foreign Application Priority Data

Aug. 10, 2006 (JP) ............................. 2006-218927

(51) Int. Cl.
*G05F 1/40* (2006.01)
*G05F 1/56* (2006.01)
(52) U.S. Cl. ........................... 323/284; 323/271
(58) Field of Classification Search .......... 323/222–225, 323/268, 271, 282–285
See application file for complete search history.

(56) References Cited

U.S. PATENT DOCUMENTS

| 5,764,024 | A | 6/1998 | Wilson | |
|---|---|---|---|---|
| 5,912,552 | A * | 6/1999 | Tateishi | 323/285 |
| 6,538,418 | B2 * | 3/2003 | Miyazaki | 323/284 |
| 6,580,258 | B2 * | 6/2003 | Wilcox et al. | 323/282 |
| 6,954,055 | B2 | 10/2005 | Umemoto et al. | |
| 7,365,526 | B2 * | 4/2008 | Cha et al. | 323/284 |
| 7,436,160 | B2 * | 10/2008 | Rusu et al. | 323/284 |
| 7,456,620 | B2 * | 11/2008 | Maksimovic et al. | 323/283 |
| 2010/0060254 | A1 * | 3/2010 | Tokura et al. | 323/299 |

FOREIGN PATENT DOCUMENTS

| JP | A 10-285937 | 10/1998 |
|---|---|---|
| JP | A 2000-092824 | 3/2000 |
| JP | A 2004-023846 | 1/2004 |
| JP | A 2004-248374 | 9/2004 |
| JP | A 2004-248480 | 9/2004 |
| JP | A 2006-074898 | 3/2006 |

* cited by examiner

*Primary Examiner*—Matthew V Nguyen
(74) *Attorney, Agent, or Firm*—Oliff & Berridge, PLC

(57) ABSTRACT

A desired current is caused to flow through a coil by controlling switching of switching elements by a PWM controller. For a voltage sensor, a value of Vo–ΔV, which is a difference between a midpoint voltage Vo of the switching elements and a predetermined threshold voltage ΔV, and a value of Vo–(Vc–ΔV), which is a difference between the midpoint voltage Vo and a value obtained by subtracting the threshold voltage ΔV from a voltage Vc of an upper line, are determined. Then, the determined results obtained from the voltage sensor are input to the PWM controller through flip-flops and a dead time compensator to compensate for dead time, such as, for example, for a command for PWM control signal generation.

6 Claims, 23 Drawing Sheets

| CURRENT STATE | F1 | F2 |
|---|---|---|
| HIGH POSITIVE CURRENT | 0 | 0 |
| LOW CURRENT | 1 | 0 |
| HIGH NEGATIVE CURRENT | 1 | 1 |
| INEFFECTIVE COMBINATION | 0 | 1 |

| CURRENT STATE | F1 | F2 | F3 |
|---|---|---|---|
| HIGH POSITIVE CURRENT | 0 | 0 | 0 |
| LOW POSITIVE CURRENT | 1 | 0 | 0 |
| LOW NEGATIVE CURRENT | 1 | 0 | 1 |
| HIGH NEGATIVE CURRENT | 1 | 1 | 1 |

POWER CONVERSION CIRCUIT

TECHNICAL FIELD

The present invention relates to a power conversion circuit in which two switching elements connected in series between an upper power supply line and a lower power supply line are turned ON and OFF and an output is taken out from a midpoint.

BACKGROUND ART

Conventionally, in inverters and converters for motor driving, there is adopted a configuration in which two switching elements are connected in series, an input voltage is applied to both ends thereof, and an output is obtained from a midpoint. For example, if, in the case of a three phase inverter, three sets including six switching elements (three sets of switching element groups each consisting of two switching elements) are provided to an input voltage, the six switching elements are turned ON and OFF, and a three phase current is outputted from each midpoint of the sets of the switching element groups.

Furthermore, in such a circuit, pulse width modulation (PWM) control is performed to control the output current. In the PWM control, a normal triangular wave is compared with a command voltage and an on period of the switching elements is determined. Then, it is possible to control the outputs to be a predetermined one by changing the command voltage.

However, in such a power conversion circuit using switching elements, the power supply will be short circuited if upper and lower switching elements are turned ON at the same time, and, therefore, care must be taken to avoid such a situation from occurring. For this reason, a dead time in which both the upper and lower switching elements are turned OFF in switching is provided.

In configurations wherein a dead time is provided, when a current is allowed to flow from a midpoint of two switching elements connected in series between an upper power supply line and a lower power supply line, the current is directed through a diode connected in reversely parallel to the lower power supply line during the dead time period; as such, errors in which the output voltage decreases during the dead time period are generated in the command voltage. Furthermore, during the dead time period, at the time when the current is flowing through the midpoint, the current is directed through a diode connected in reversely parallel to the upper power supply line, such that errors in which the output voltage increases for the dead time period are generated in the command voltage. Because the current which flowing through the midpoint is near zero, this current will not effect the output voltage to the command voltage. A technique which uses this to compensate for the dead time is proposed in the prior art.

In Patent Document 1 (Japanese Patent Application Laid-Open No. 10-285937), at the end of a dead time, a voltage at an output terminal is measured, a direction of a load current connected thereto is determined by whether or not the measured voltage exceeds a threshold, and compensation for the dead time is determined in consideration of the determined result.

Furthermore, in Patent Document 2 (Japanese Patent Application Laid-Open No. 2004-248480), a current flowing through a load is detected by a current sensor, a direction of the current is determined, and dead time is compensated for in consideration of the determined result.

In the art described in Patent Document 1, when a voltage between upper and lower lines is changed, a voltage value of a voltage waveform at the output end is also changed. Therefore, there are situations wherein the direction of the load current cannot be correctly detected by a method in which the voltage at the output end is compared with the threshold having a constant value.

Furthermore, in the art described Patent Document 2, when there is an offset error in the current sensor or a current ripple is large, the current direction cannot be correctly determined.

DISCLOSURE OF THE INVENTION

According to the present invention, there is provided a power conversion circuit in which two switching elements connected in series between an upper line of a high voltage and a lower line of a low voltage are provided; free wheel diodes connected in reversely parallel to the respective switching elements are provided; the switching elements are turned ON and OFF; a dead time is set so that the switching elements connected in series are not turned ON together, and an output is obtained from a midpoint of the two switching elements. The power conversion circuit includes a voltage sensor in which a voltage Vo of the midpoint, a voltage Vc between the upper and lower lines, and a predetermined threshold voltage $\Delta V$ are inputted; and a state of Vo is detected by values of Vo$-\Delta V$ and Vo$-$(Vc$-\Delta V$). The dead time of a command for controlling switching of the switching elements is compensated based on the results detected by the voltage sensor.

Furthermore, it is preferable that the voltage sensor includes a first comparator to which Vo and $\Delta V$ are input and these voltages are compared; a subtractor which uses an operational amplifier to which Vc and $\Delta V$ are input and a difference between these voltages is output; and a second comparator to which the output of the subtractor and Vo are input and these voltages are compared.

Still furthermore, it is preferable that the voltage sensor includes a first flip-flop which obtains the compared result of the first comparator and a second flip-flop which obtains the compared result of the second comparator, the outputs of the first flip-flop and the second flip-flop being output as detection results.

Yet furthermore, it is preferable that the first flip-flop obtains the results of the comparison performed by the first comparator at a timing that the switching element of the upper power supply line side is turned ON; and the second flip-flop obtains the results of the comparison performed by the second comparator at a timing that the switching element of the lower power supply line side is turned ON.

Further, it is preferable that the voltage sensor further includes a third flip-flop which obtains the results of the comparison performed by of the first comparator at a timing at which the switching element of the lower power supply line side is turned ON, the outputs of the first to third flip-flops being output as detection results.

Still further, it is preferable that the voltages Vo and Vc are voltages reduced in voltage by resistance-dividing by the same voltage division ratio.

According to the present invention, a current state attributable to a voltage Vo can be reliably detected by using one threshold voltage $\Delta V$. Therefore, a dead time can be properly compensated for.

BEST MODE FOR CARRYING OUT THE INVENTION

Hereinafter, an embodiment of the present invention will be described below on the basis of drawings.

Figure 1:
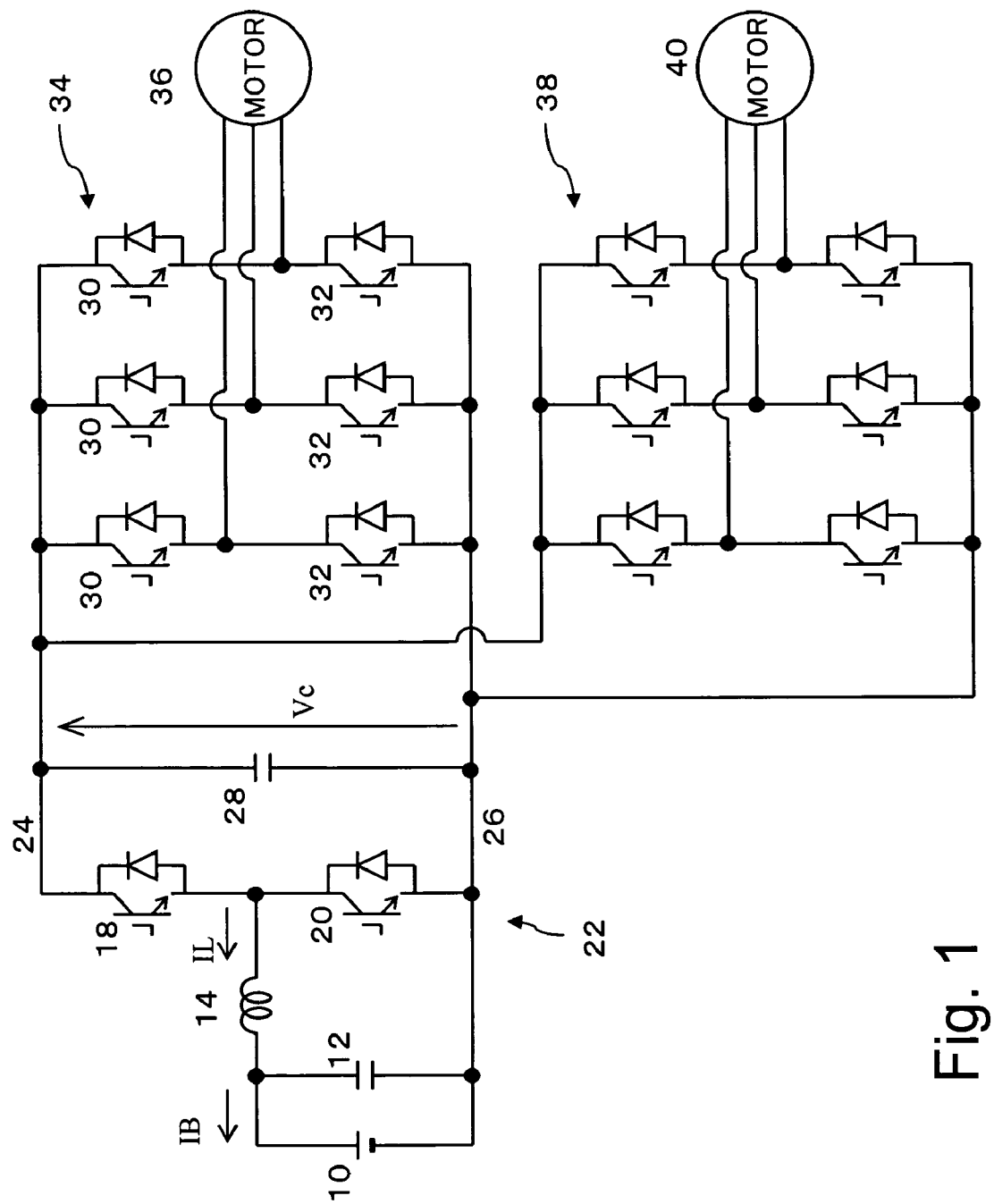
FIG. 1 is a diagram showing a configuration of a motor driving system including a DC/DC converter and an inverter serving as a power converter.

FIG. 1 is a diagram showing a configuration of a motor driving system including a power conversion circuit according to an embodiment of the present invention.

A battery 10 is a secondary battery such as a nickel hydrogen or lithium ion battery having a voltage of approximately 200 V, for example. The battery 10 is connected in parallel to a capacitor 12, which prevents voltage fluctuation of the battery 10. The positive pole side of the battery is connected to one end of a coil 14. The other end of the coil 14 is connected to a node of two switching elements 18 and 20.

Upper and lower switching elements 18 and 20 are each composed by a transistor such as an insulated gate bipolar transistor (IGBT), and in this example the transistor is connected in parallel to a diode which allows a current to flow in a reverse direction.

The upper switching element 18 has a collector connected to an upper line 24, and an emitter connected to a collector of the lower switching element 20. Furthermore, an emitter of the lower switching element 20 is connected to a lower line 26 that is the cathode side of the battery 10. In addition, the coil 14 and the upper and lower switching elements 18 and 20 constitute a DC/DC converter 22 which boosts an output voltage of the battery 10.

A capacitor 28 is arranged between the upper line 24 and the lower line 26, and the capacitor 28 suppresses voltage fluctuation of the upper line 24.

Further, three sets of switching element groups each consisting of two switching elements 30 and 32 connected in series are arranged in parallel between the upper line 24 and the lower line 26, and an inverter 34 is constituted by these switching elements. Then, a set of a first set of the switching elements 30 and 32 is for U phase, a set of a second set of the switching elements 30 and 32 is for V phase, and a set of a third set of the switching elements 30 and 32 is for W phase, and midpoints of the respective sets of the switching elements 30 and 32 are connected to coils of U, V, and W phases of a motor 36.

Furthermore, in this example, an inverter 38 having a similar configuration is also connected between the upper line 24 and the lower line 26, and a motor 40 is connected to the inverter 38.

In such a circuit, a current to be directed through the coil 14 is controlled by alternatively turning ON the upper and lower switching elements 18 and 20 of the DC/DC-converter 22, and a boosted voltage not lower than the voltage of the battery 10 is obtained in the upper line 24 by a back electromotive force across the coil 14. The degree of boosting is controlled by adjusting the ratio of ON periods of the upper and lower switching elements 18 and 20.

Furthermore, the inverter 34 turns ON the switching elements 30 and 32 sequentially in a predetermined order using a voltage between the upper line 24 and the lower line 26 as an input voltage, and supplies a three phase alternating current to the motor 36. Further, the inverter 38 also similarly supplies a three phase alternating current to the motor 40. Accordingly, the two motors 36 and 40 are driven in response to the control of the inverters 34 and 38.

In addition, regenerative braking can be performed by having the motors 36 and 40 function as a generator through control of the inverters 34 and 38, and, accordingly, electric power can be recovered in the capacitor 28.

Such a system can be used in a driving system of a hybrid car, for example. In this case, an output shaft of the motor 40 which mainly functions as a generator is connected to an inside gear, a planetary gear arranged around thereof is connected to an output shaft of an engine, and an outside gear on the outside of the planetary gear is connected to an output shaft and a tire driving shaft of the motor 36. Accordingly, driving of the motors 36 and 40 and driving of the engine are controlled, and an output of a desired driving force and power generation can be controlled. In addition, in the case of the hybrid car system, for example, a voltage of approximately 300 V is used as the battery 10, and the voltage of the upper line 24 can be set to a proper voltage corresponding to an output torque in a range of approximately 300 V to 600 V.

Figure 2:
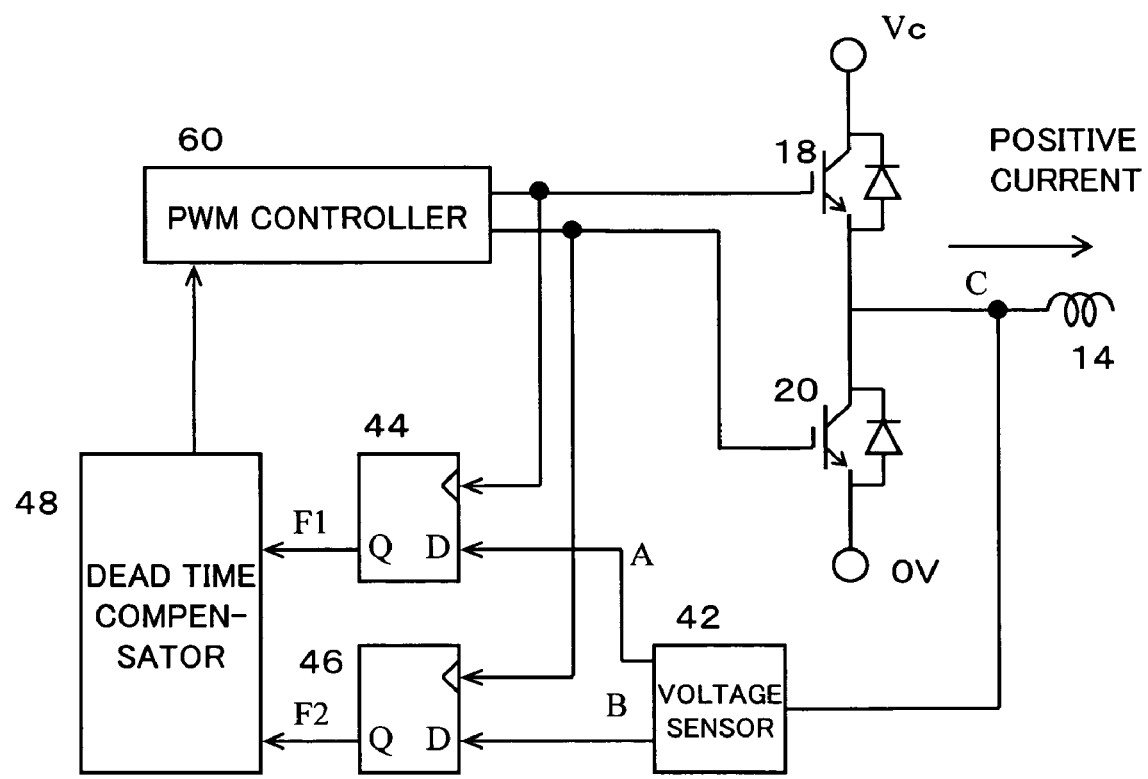
FIG. 2 is a diagram showing a configuration employed for compensating for a dead time.

FIG. 2 shows a mechanism which compensates for dead time on the upper and lower switching elements 18 and 20 of the DC/DC converter 22 shown in FIG. 1. In addition, the inverters 34 and 38 can also similarly compensate for dead time. That is, concerning the inverters 34 and 38, a plurality of sets of the upper and lower two switching elements 30 and 32 are provided, the switching elements are turned ON and OFF, and the dead time is set such that the switching elements connected in series are not turned ON at the same time.

Gates of the upper and lower switching elements 18 and 20 are connected to a PWM controller 60, and the upper and lower switching elements 18 and 20 are turned ON and OFF by PWM control signals derived from the PWM controller 60. A voltage sensor 42 is connected to the node of the upper switching elements 18 and 20 to which the coil 14 is connected (point C), and a voltage at the node C is measured by the voltage sensor 42. In this case, the voltage sensor 42 determines the voltage at the node C as described later, and outputs signals A and B based on the results of that determination. In addition, in this example, a current flown from the node C to the coil 14 is referred to as IL, and its direction is set as a positive direction.

The signals A and B are input to data input ends D of flip-flops 44 and 46. The PWM control signals to be supplied to the gates of the upper and lower switching elements 18 and 20 are supplied to clock input ends of the flip-flops 44 and 46, and the flip-flops 44 and 46 retrieve the respective signals A and B supplied to the input ends D by raises of two PWM control signals.

Q outputs F1 and F2 of the flip-flops 44 and 46 are supplied to a dead time compensator 48. The dead time compensator 48 consults a table to determine the current direction at the node C in response to states of the signals F1 and F2 to be input to the inside thereof, and generates a control signal for compensating the dead time corresponding to the determined results.

The PWM controller 60 corrects a command voltage which compares with a triangular wave from the current direction of the dead time in response to the signal supplied from the dead time compensator 48, changes a duty ratio of the upper and lower switching elements 18 and 20, and compensates the dead time. In addition, the detail of the operation will be described later.

Next, a configuration of the voltage sensor 42 will be described on the basis of FIG. 3. A voltage Vo at the node C that is a midpoint of the upper and lower switching elements 18 and 20 shown in FIG. 2 is applied to a resistance voltage divider 50. The resistance voltage divider 50 is made up of resistors 50a and 50b connected in series, the resistance voltage divider 50 has one end connected to the ground and the other end connected to the node C, and an output corresponding to a resistance ratio of the resistors 50a and 50b is obtained from a midpoint. A voltage division ratio of the resistance voltage divider 50 is set to an appropriate value not higher not exceeding the maximum voltage of the IC (for example, +155 V, 12 V, or the like), so that the circuit (IC constituting a logic circuit) shown in FIG. 3 preferably operates at the maximum input voltage. The output of the resistance voltage divider 50 is input to the positive input end of a first comparator 52 via a predetermined resistor.

On the other hand, a voltage Vc of the upper line 24 (voltage of the collector of the upper switching element 18) is applied to a resistance voltage divider 54. The resistance voltage divider 54 is made up of resistors 54a and 54b connected in series, the resistance voltage divider 54 has one end connected to the ground and the other end connected to the node C, and an output corresponding to a resistance ratio of the resistors 50a and 50b is obtained from a midpoint. In this case, a voltage division ratio of the resistance voltage divider 54 is the same as that of the resistance voltage divider 50. The output of the resistance voltage divider 54 is input to a subtractor 56 via a resistor.

In addition, the output of the resistance voltage divider 50 is the voltage-divided Vo and the output of the resistance voltage divider 54 is the voltage-divided Vc, however, their voltage division ratios are the same, and their voltages are merely referred to as Vo and Vc.

The subtractor 56 has an operational amplifier 56a and the output end thereof is connected to the negative input end of the first comparator 52 via a resistor. Then, the output of the resistance voltage divider 54 is inputted to the positive input end of the operational amplifier 56a via a resistor, and a predetermined threshold voltage $\Delta V$ is input to the negative input end via a resistor and connected to the ground via a different resistor. Then, an output of the operational amplifier 56a is an output of the subtractor 56. As described, the input at the positive input end of the operational amplifier 56a is the output Vc of the resistance voltage divider 54, the input at the negative input end is the threshold voltage $\Delta V$, the operational amplifier 56a is an inverting amplifier with the magnitude being one time as large as the amplification, and the output of the subtractor 56 is $Vc-\Delta V$.

In this case, the threshold voltage $\Delta V$ is a voltage value of approximately 1/10 to 1/30 of the maximum voltage of Vc, and becomes a voltage in which the voltage thereof is reduced by the same voltage division ratio as that of the resistance voltage dividers 50 and 54. However, the voltage value is not limited to this value, but the voltage value may be set to a value which can detect that the output voltage is nearly zero voltage and the output voltage is nearly Vc in a state where there is an error and noise of the voltage sensor 42.

The output of the subtractor 56 $Vc-\Delta V$ (=Y, referred to as Y) is input to the negative input end of the first comparator 52, and the output end of the first comparator 52 is boosted to a logic voltage 5 V. Therefore, the first comparator 52 performs a comparison of $Vo-(Vc-\Delta V)$, and the first comparator 52 outputs an H level ("1") of 5 V if the resultant is positive and an L level ("0") of 0 V if the resultant is negative. The output of the first comparator 52 is B shown in FIG. 2.

Furthermore, the output Vo of the resistance voltage divider 50 is input to the positive input end of a second comparator 58 via a resistor. The threshold voltage $\Delta V$ is input to the negative input end of the second comparator 58 via a resistor. Therefore, the output end of the second comparator 58 is boosted to the logic voltage 5 V. Accordingly, the second comparator 58 performs a comparison of $Vo-\Delta V$, and the second comparator 58 outputs an H level ("1") of 5 V if the resultant is positive and an L level ("0") of 0 V if the resultant is negative. The output of the first comparator 52 is A, as shown in FIG. 2.

Figure 3:
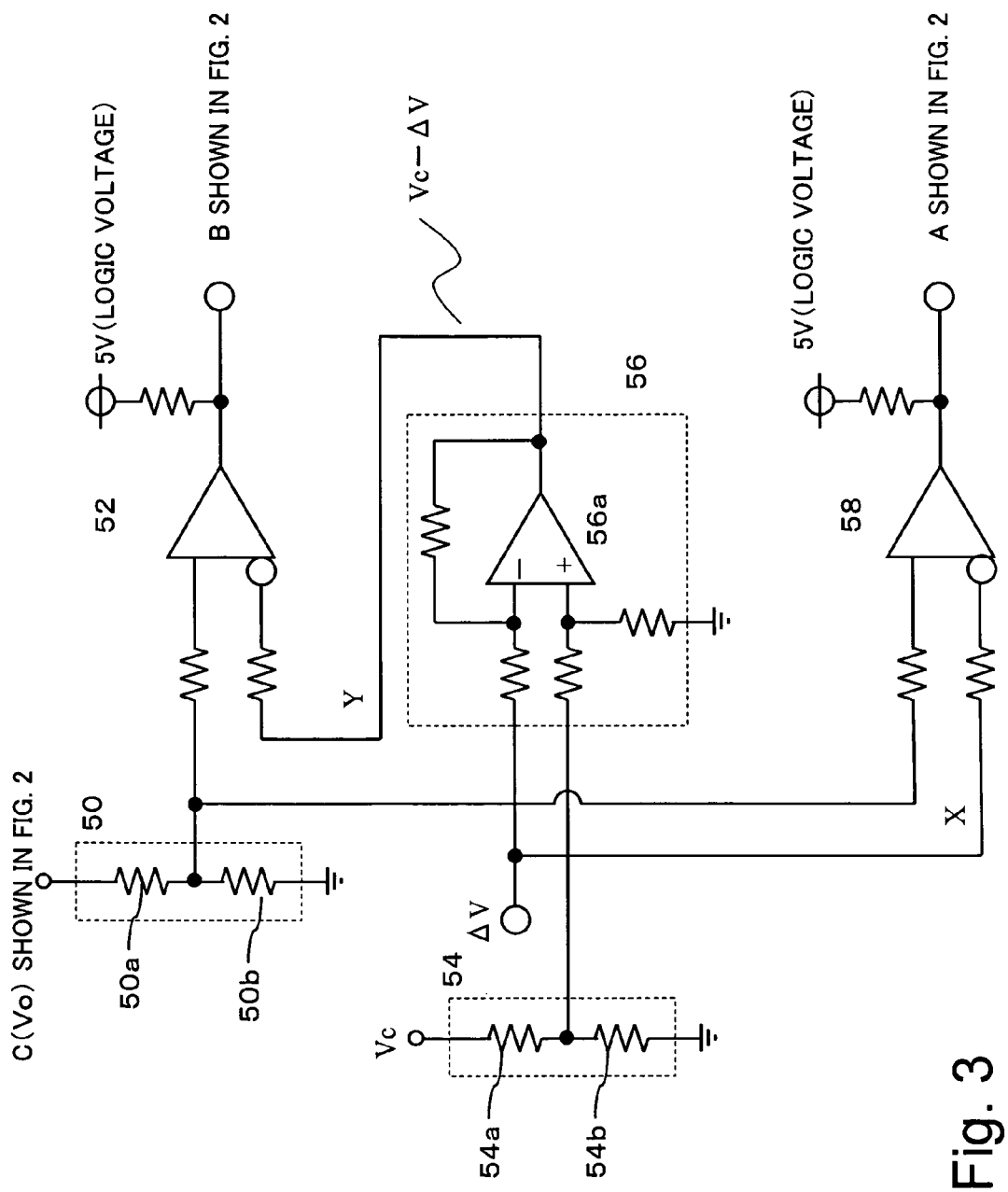
FIG. 3 is a diagram showing a configuration of a voltage sensor 42.

As described, according to the voltage sensor 42 shown in FIG. 3, only one threshold voltage $\Delta V$ is provided, but a current direction corresponding to a state of the moment can be determined using this value.

Figures 13, 14:
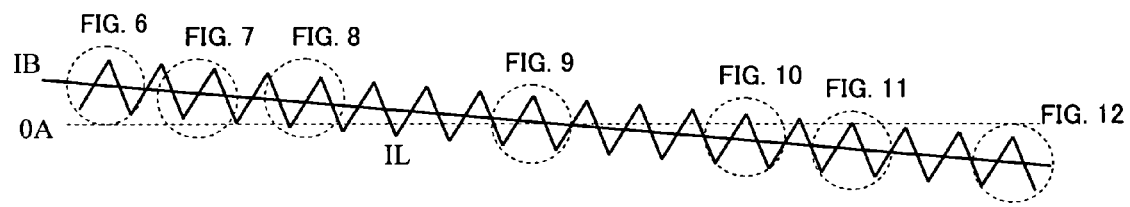
FIG. 13 is a diagram showing a current waveform if a current state is changed.
FIG. 14 is a diagram showing determination results of the current states.

FIG. 13 shows a current waveform. In this example, a current which flows from the midpoint of the upper and lower switching elements 18 and 20 to the coil 14 is referred to as IL, a fundamental wave component that is the center of the current IL is referred to as current IB, and with respect to 0 A, there is shown a typical state wherein the current IL is gradually changed from a state at a high positive current to a state at a high negative current. The fundamental wave component IB corresponds to the current direction in the dead time. Consequently, when compensating for the dead time, the command voltage is increased at a high positive current, and the command voltage is decreased at a high negative current.

Figure 6:
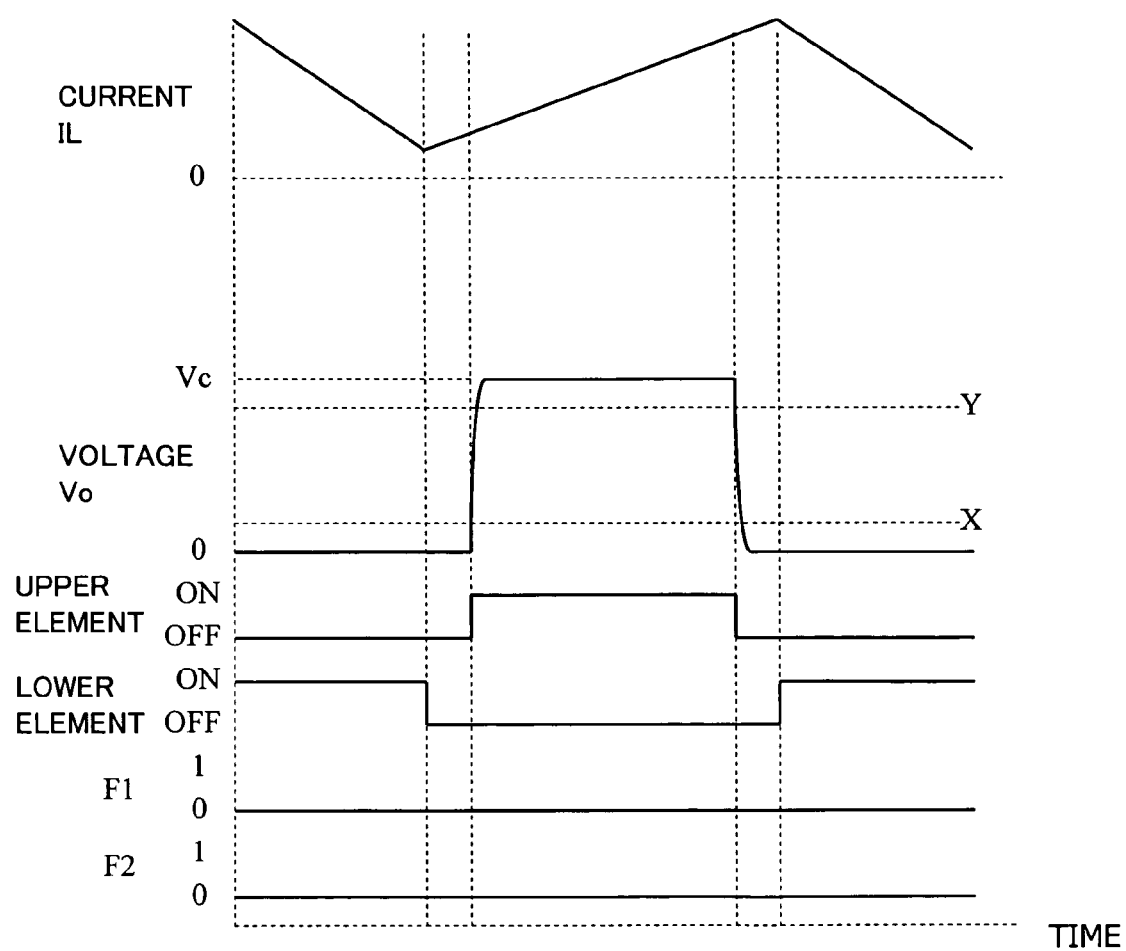
FIG. 6 is a diagram showing a waveform at a high positive current.

FIG. 6 shows a waveform at a high positive current. The voltage Vo is raised after the upper switching element 18 is turned ON, and is immediately reduced when the upper switching element 18 is turned OFF. Therefore, F1 becomes 0 and F2 becomes 0.

Figure 7:
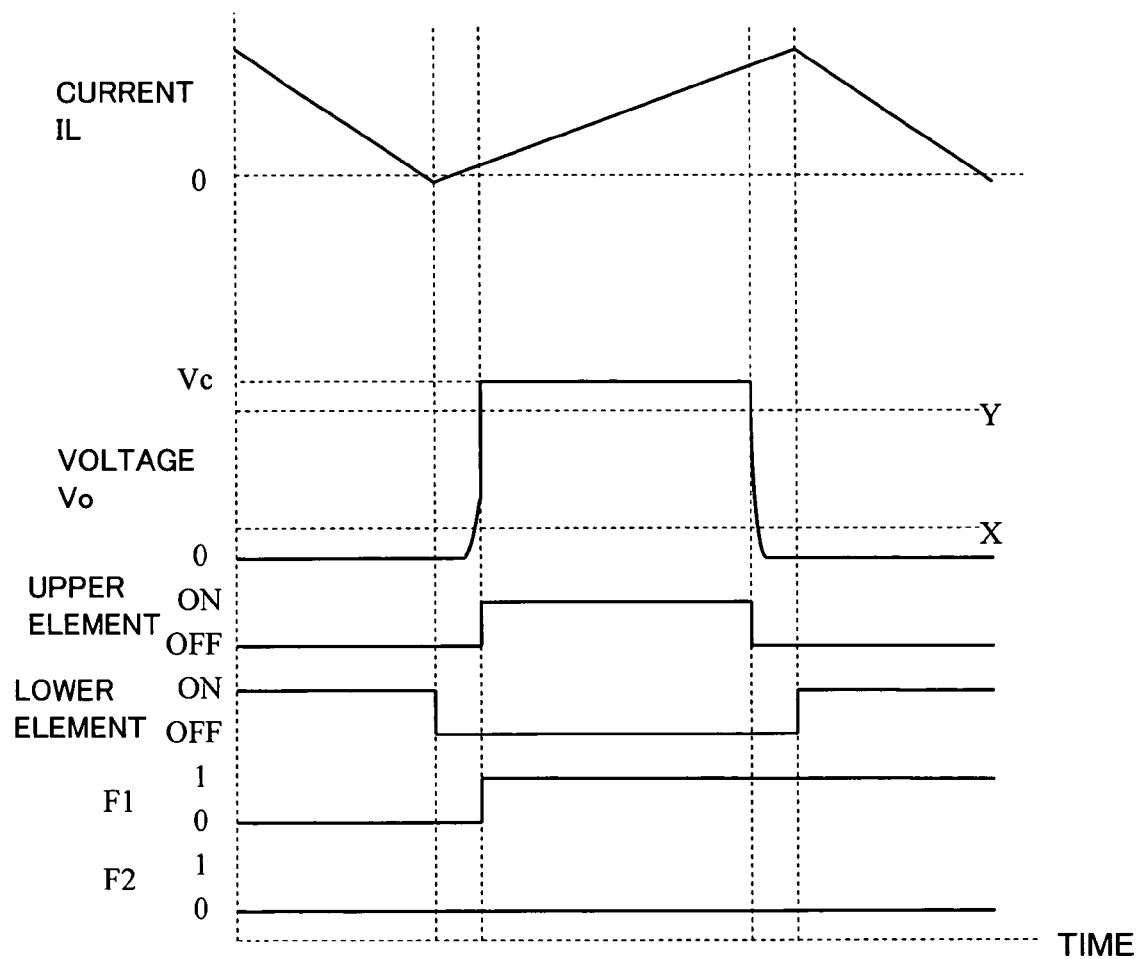
FIG. 7 is a diagram showing a waveform 1 at a low positive current.

FIG. 7 shows a waveform 1 at a low positive current. The voltage Vo is raised immediately before the upper switching element 18 is turned ON and becomes nearly Vc when the upper switching element 18 is turned ON, and is immediately reduced when the upper switching element 18 is turned OFF. Therefore, F1 becomes 1 and F2 becomes 0.

Figure 8:
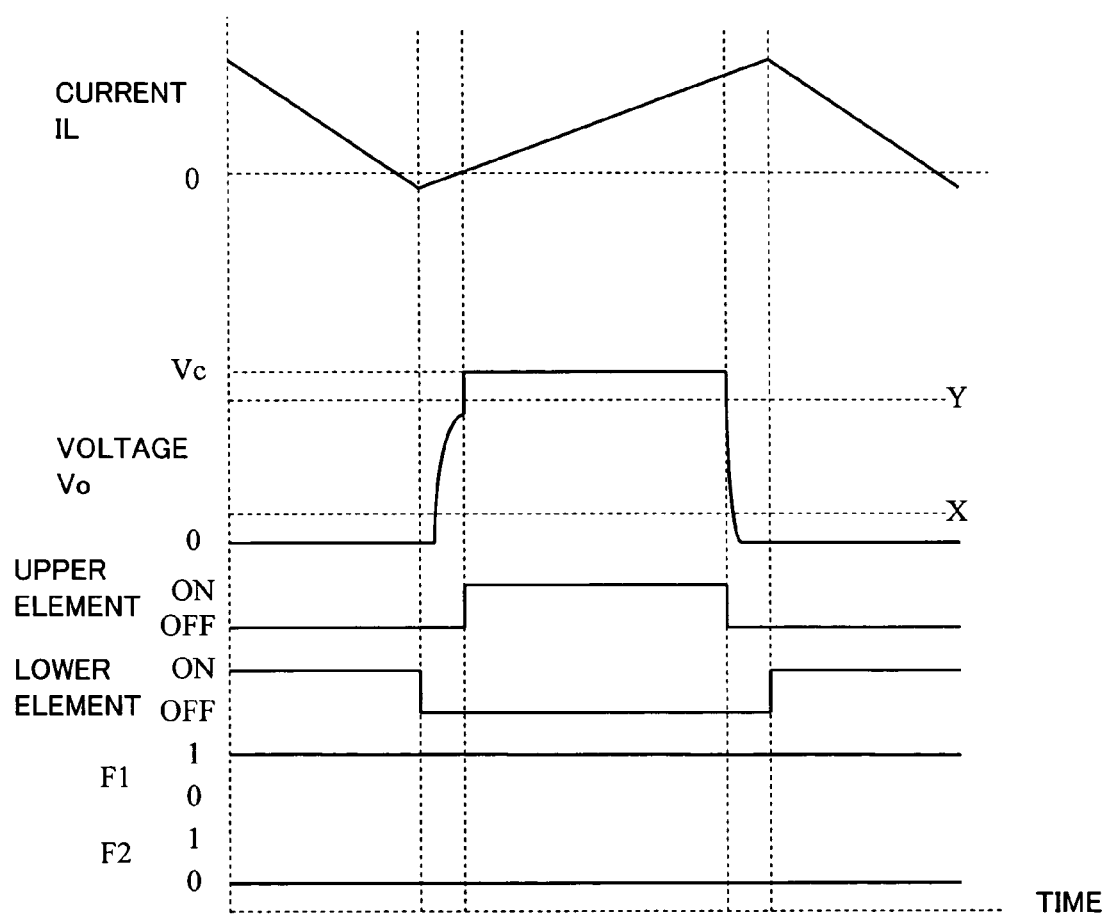
FIG. 8 is a diagram showing a waveform 2 at a low positive current.

FIG. 8 shows a waveform 2 at a low positive current. The voltage Vo is raised before the upper switching element 18 is turned ON, and is immediately reduced when the upper switching element 18 is turned OFF. Therefore, F1 becomes 1 and F2 becomes 0.

Figure 9:
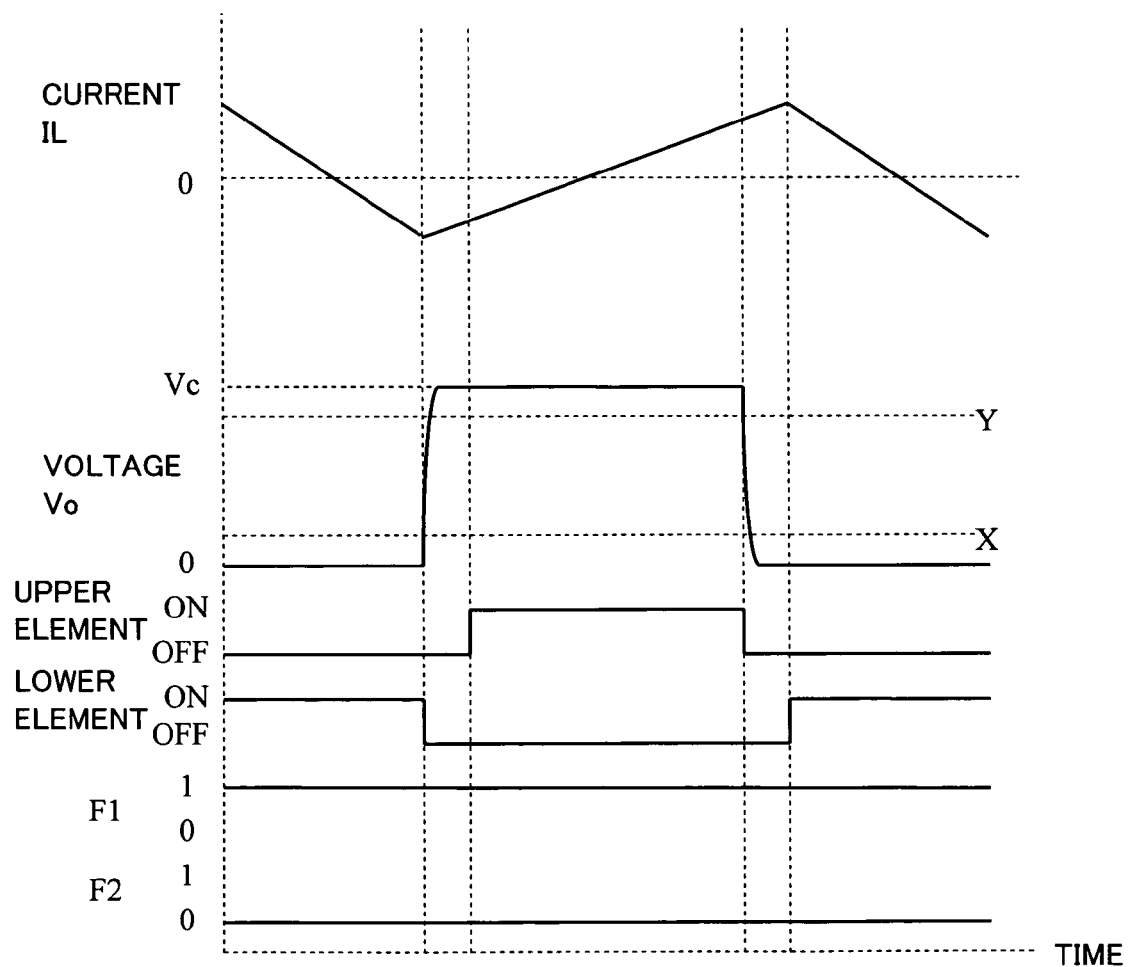
FIG. 9 is a diagram showing a waveform when the current is near zero.

FIG. 9 shows a waveform at nearly zero current. The voltage Vo is raised before the upper switching element 18 is turned ON and immediately after the lower switching element 20 is turned OFF, and is immediately reduced when the upper switching element 18 is turned OFF. Therefore, F1 becomes 1 and F2 becomes 0.

Figure 10:
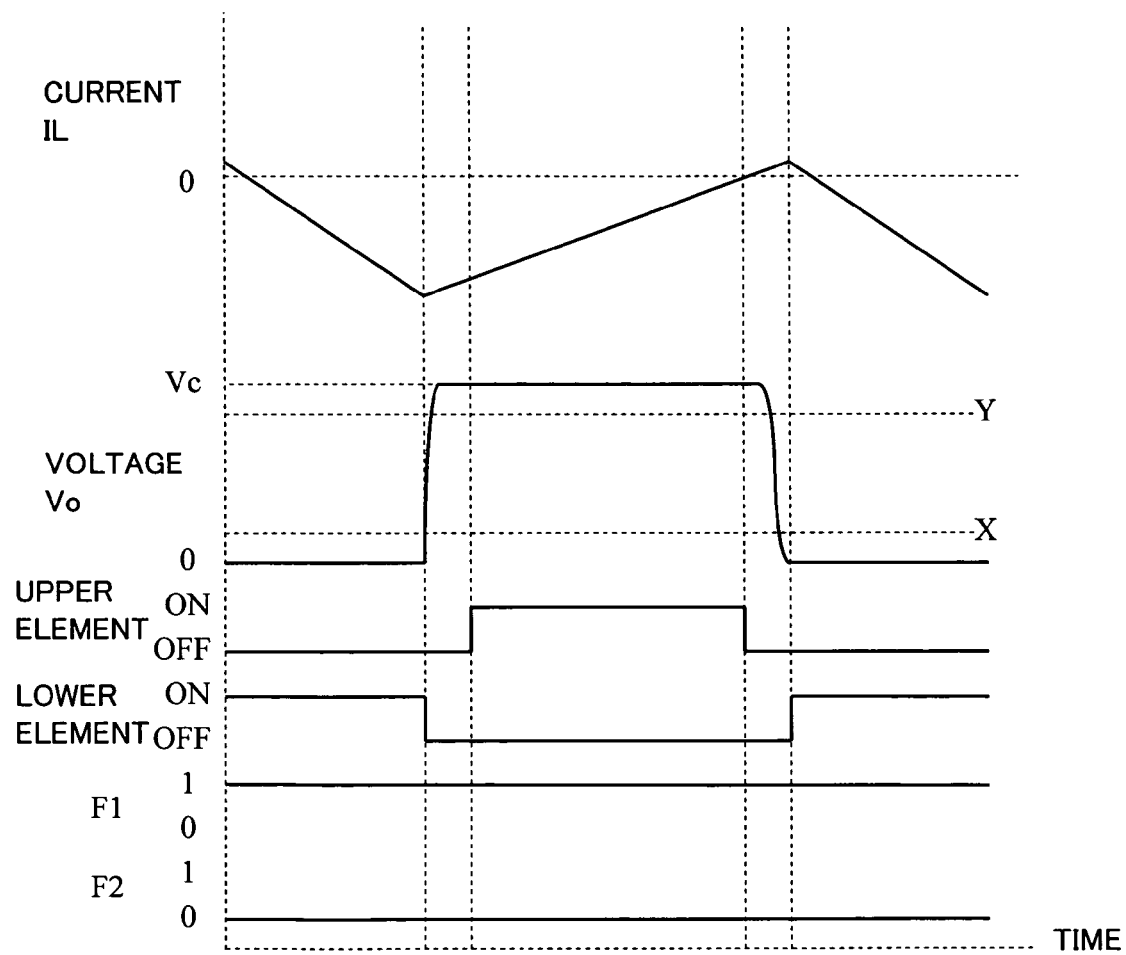
FIG. 10 is a diagram showing a waveform 1 at a low negative current.

FIG. 10 shows a waveform 1 at a low negative current. The voltage Vo is raised before the upper switching element 18 is turned ON and immediately after the lower switching element 20 is turned OFF, and is reduced after the upper switching element 18 is turned OFF and before the lower switching element 20 is turned ON. Therefore, F1 becomes 1 and F2 becomes 0.

Figure 11:
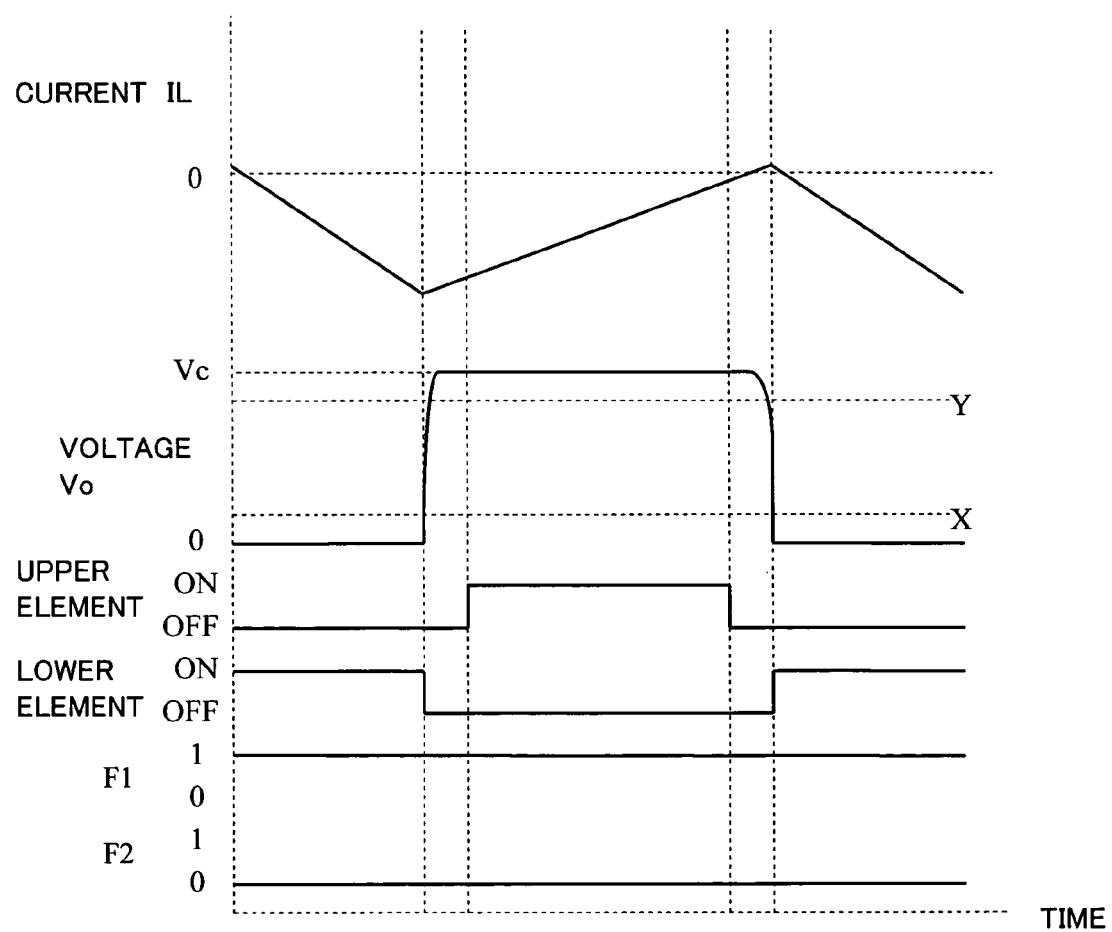
FIG. 11 is a diagram showing a waveform 2 at a low negative current.

FIG. 11 shows a waveform 2 at a low negative current. The voltage Vo is raised before the upper switching element 18 is turned ON and immediately after the lower switching element 20 is turned OFF, and is reduced after the upper switching element 18 is turned OFF and immediately before the lower switching element 20 is turned ON. Therefore, F1 becomes 1 and F2 becomes 0.

Figure 12:
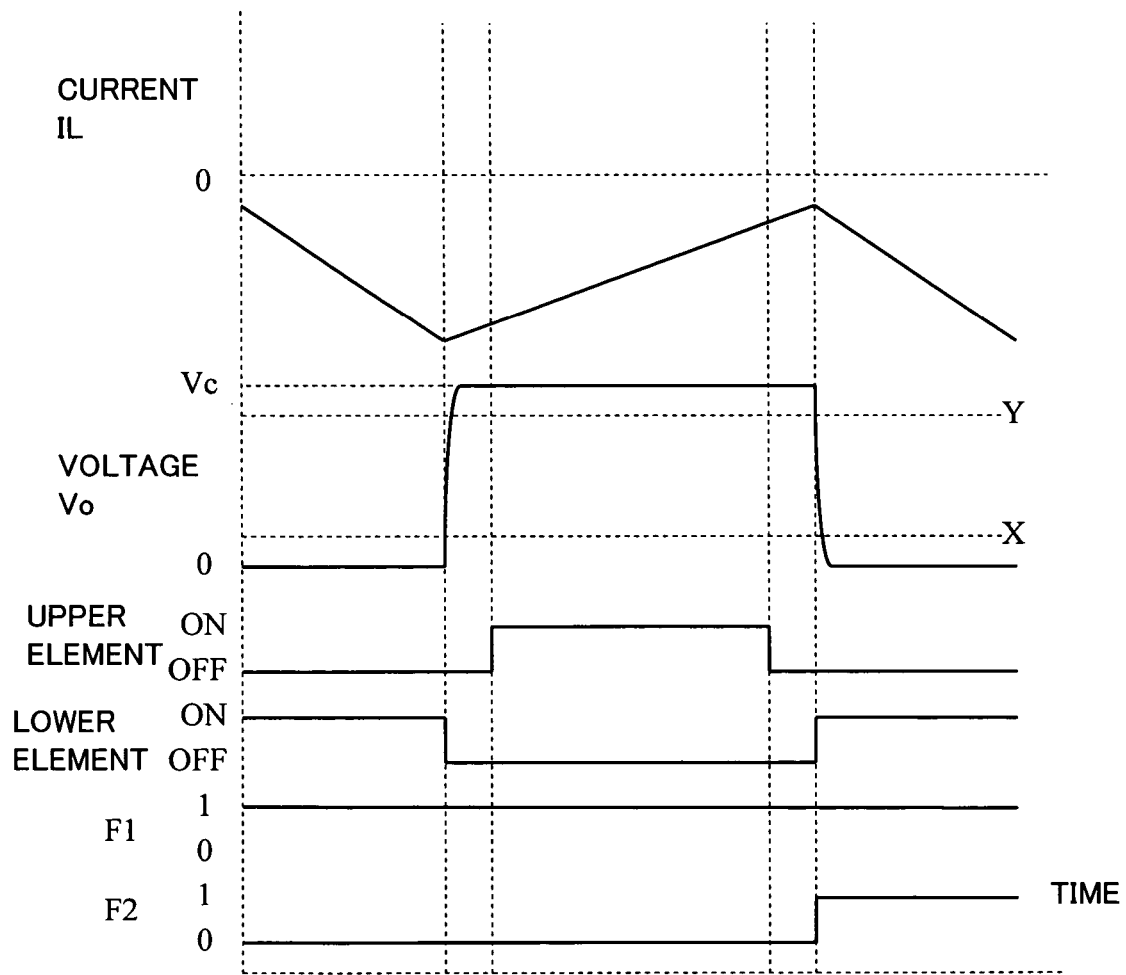
FIG. 12 is a diagram showing a waveform at a high negative current.

FIG. 12 shows a waveform at a high negative current. The voltage Vo is raised before the upper switching element 18 is turned ON and immediately after the lower switching element 20 is turned OFF, and is reduced after the lower switching element 20 is turned ON. Therefore, F1 becomes 1 and F2 becomes 1.

As described, as shown in FIG. 14, F1 becomes 0 and F2 becomes 0 at the high positive current shown in FIG. 6, F1 becomes 1 and F2 becomes 0 at the low positive or negative current shown in FIG. 7 to FIG. 11; and F1 becomes 1 and F2 becomes 1 at the high negative current shown in FIG. 12. In addition, F1=0 and F2=1 become an ineffective combination.

Then, such F1 and F2 are supplied to the dead time compensator 48, and therefore, the dead time compensator 48 sends the following control signals to the PWM controller 60, control signals for causing a control voltage to be increased by a predetermined amount of voltage at the high positive current, and control signals for causing the control voltage to be decreased by a predetermined amount of voltage at the high negative current.

As described, in the present embodiment, the dead time can be properly compensated by identifying whether it is a positive current or a negative current in response to the size of the voltage V0 of the moment while using one threshold voltage ΔV.

Figure 15:
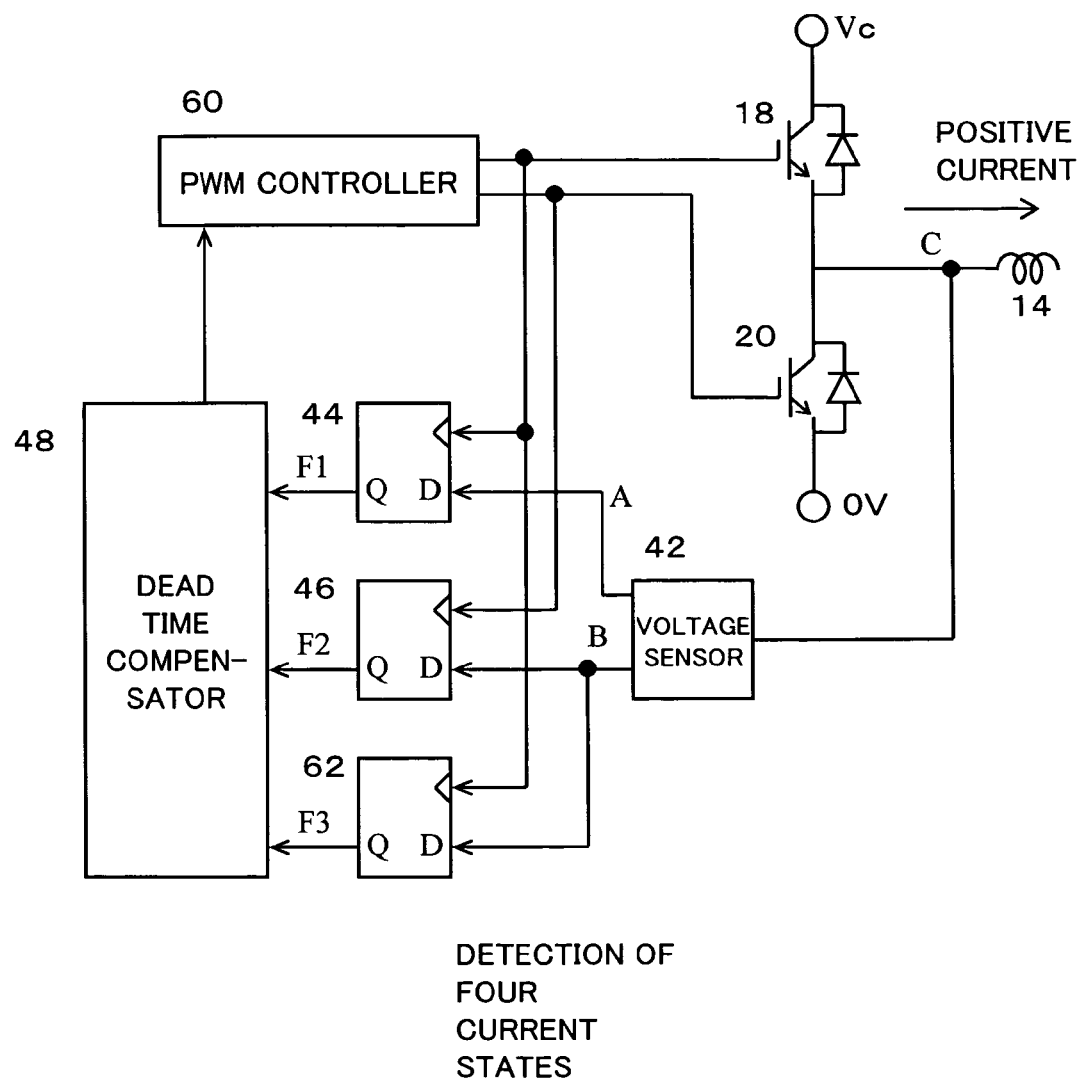
FIG. 15 is a diagram showing another configuration which is for compensating a dead time.

FIG. 15 shows another configuration for compensating for dead time. In this example, a third flip-flop 62 is provided. In the third flip-flop 62, an output B of a voltage sensor 42 is inputted to the input end D as in a second flip-flop 46. Furthermore, a control signal to be supplied to a gate of an upper switching element 18 is supplied to a clock input terminal of the third flip-flop 62.

Figures 16, 17:
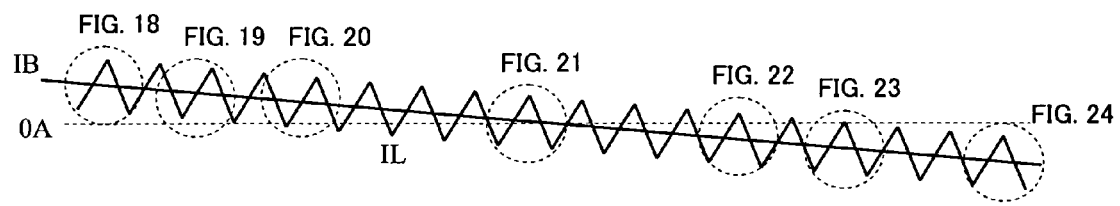
FIG. 16 is a diagram showing a current waveform if a current state is changed.
FIG. 17 is a diagram showing determination results of the current states.

FIG. 16 shows a current waveform. FIG. 16 is similar to FIG. 13, and corresponding states are labeled using corresponding numerals.

Figure 18:
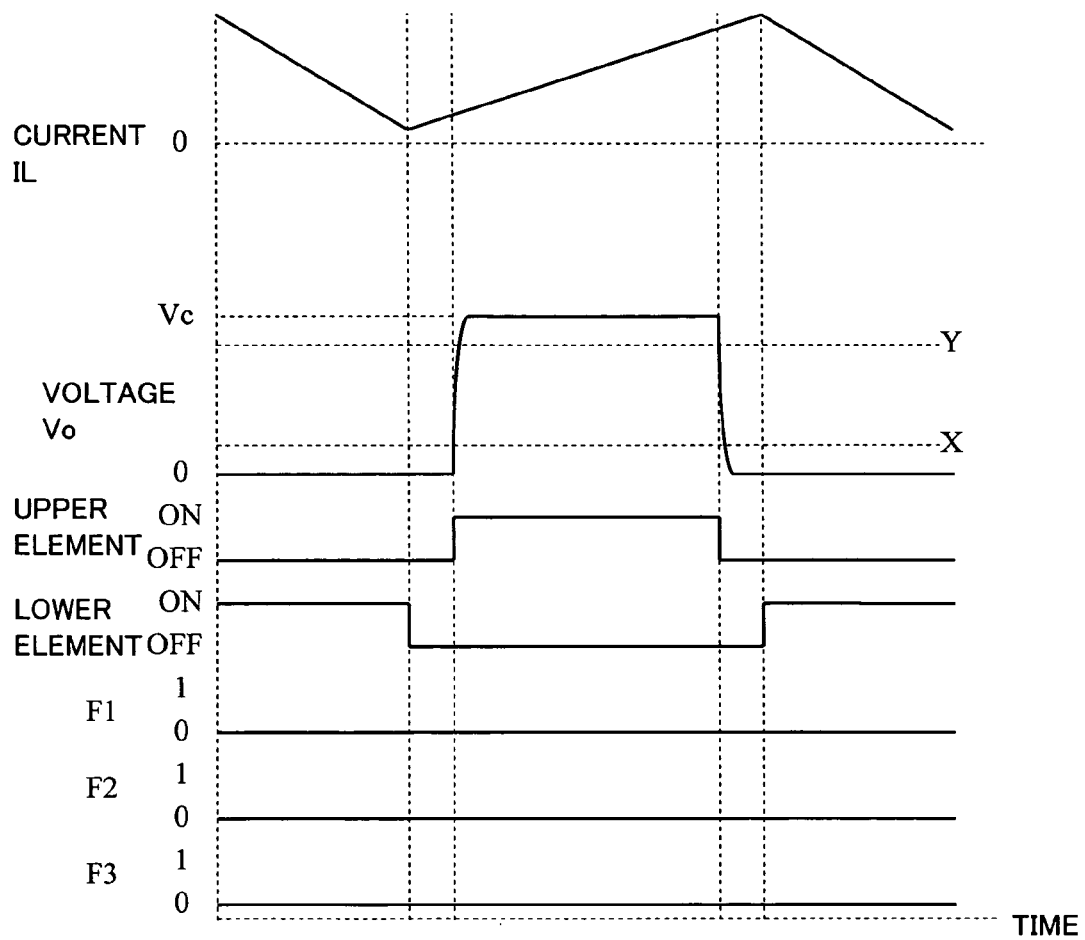
FIG. 18 is a diagram showing a waveform at a high positive current.

FIG. 18 shows a waveform at a high positive current. A voltage Vo does not reach a threshold Y when the upper switching element 18 is turned ON, and therefore the values for F1, F2, and F3 become F1=0, F2=0, and F3=0.

Figure 19:
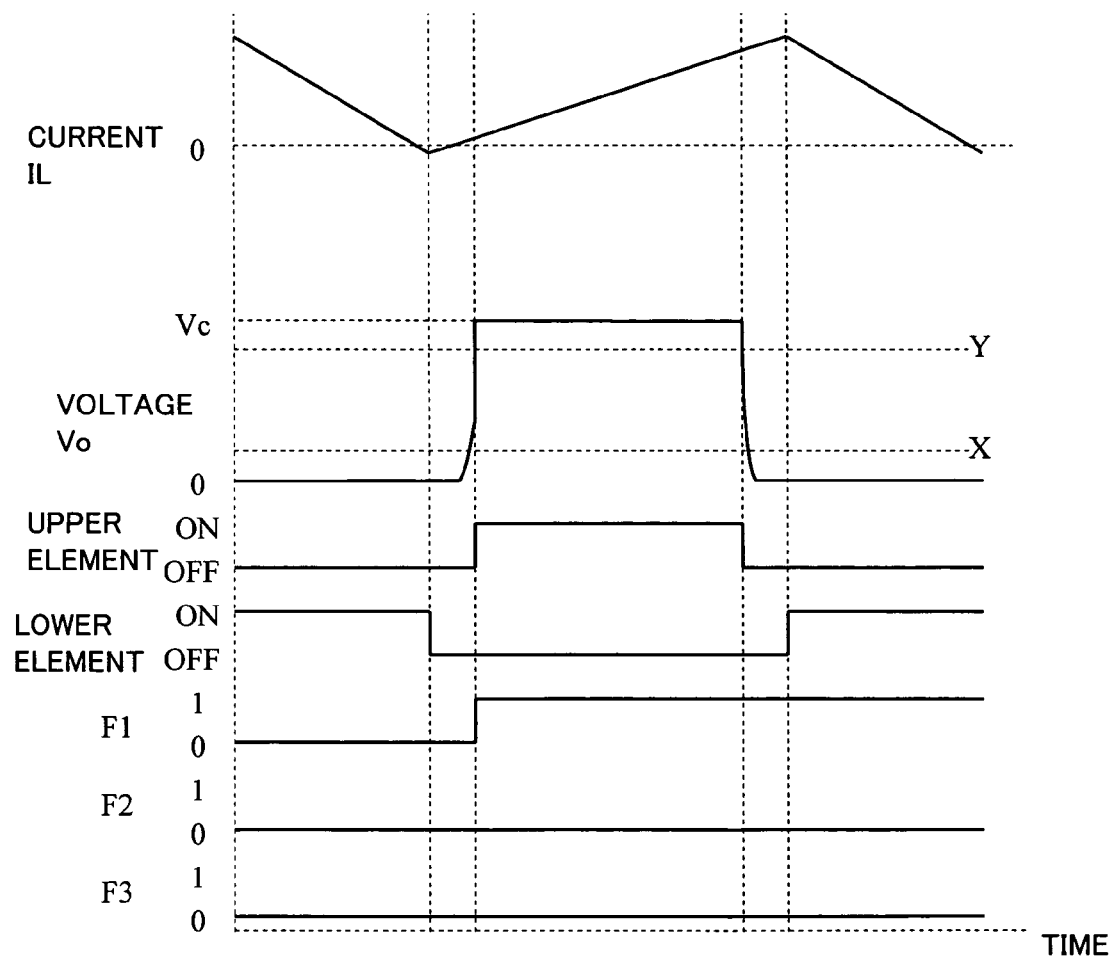
FIG. 19 is a diagram showing a waveform 1 at a low positive current.

FIG. 19 shows a waveform 1 at a low positive current. As the voltage Vo does not reach the threshold Y when the upper switching element 18 is turned ON and the values for F1, F2, and F3 become F3=0, the values for F1, F2, and F3 therefore become F1=1, F2=0, and F3=0.

Figure 20:
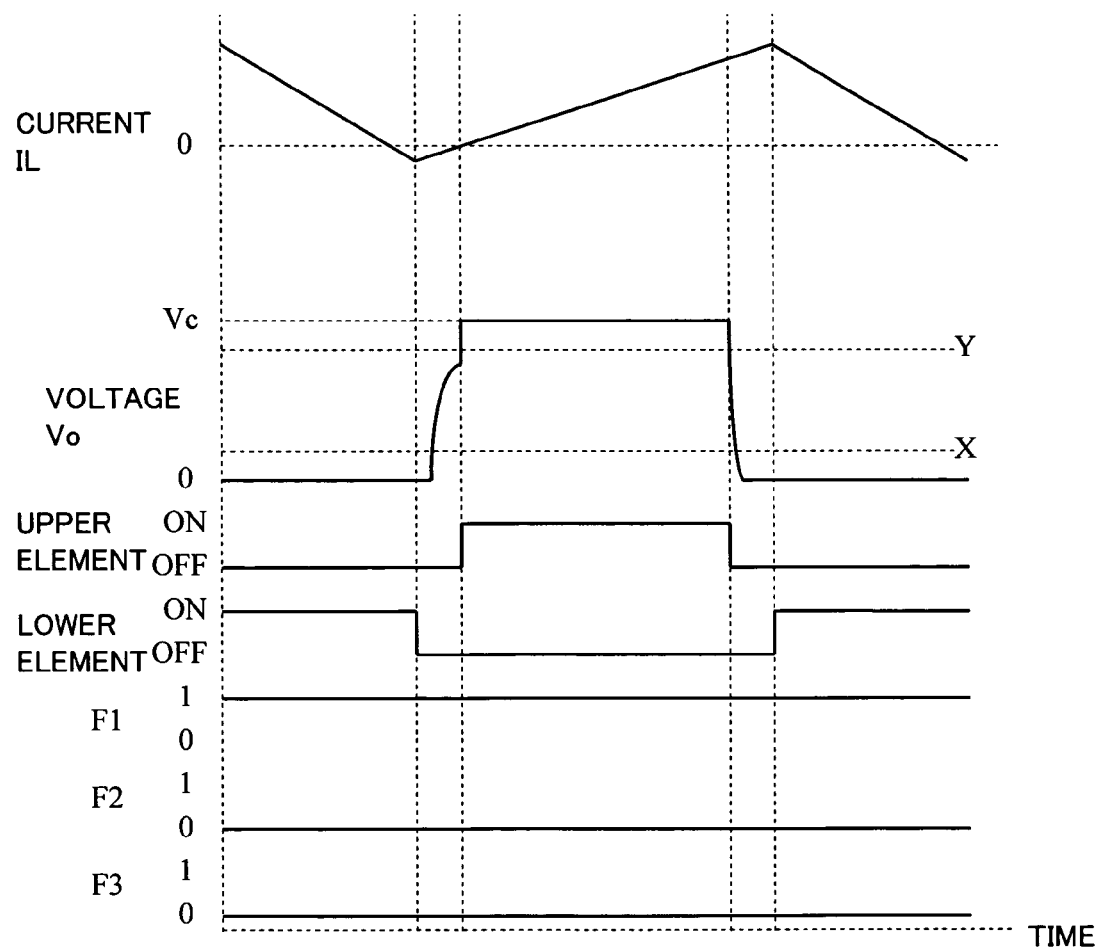
FIG. 20 is a diagram showing a waveform 2 at a low positive current.

FIG. 20 shows a waveform 2 at a low positive current. The voltage Vo does not reach the threshold Y yet when the upper switching element 18 is turned ON, and therefore the values for F1, F2, and F3 become F1=1, F2=0, and F3=0.

Figure 21:
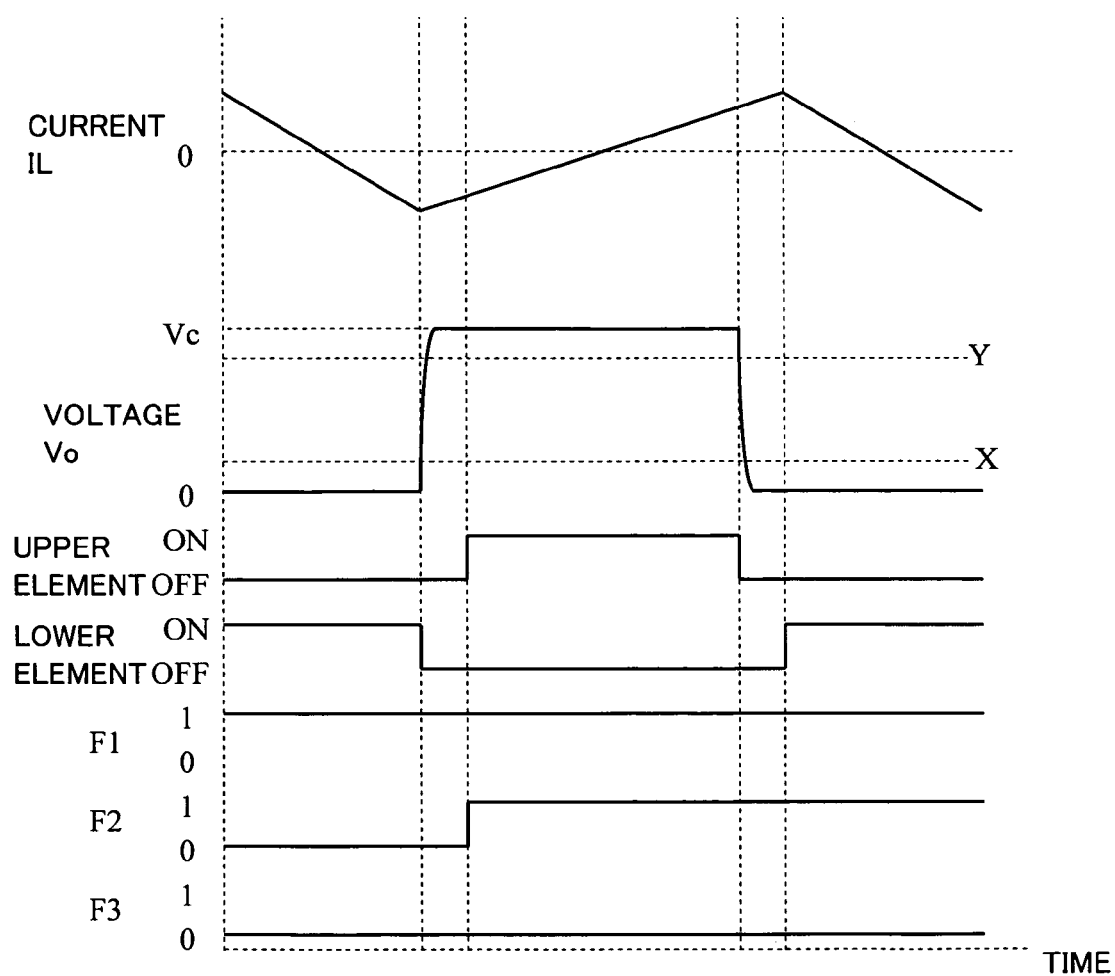
FIG. 21 is a diagram showing a waveform when the current is near zero.

FIG. 21 shows a wave format nearly zero current. The voltage V0 reaches the threshold Y when the upper switching element 18 is turned ON, and therefore the values for F1, F2, and F3 become F1=1, F2=0, and F3=1.

Figure 22:
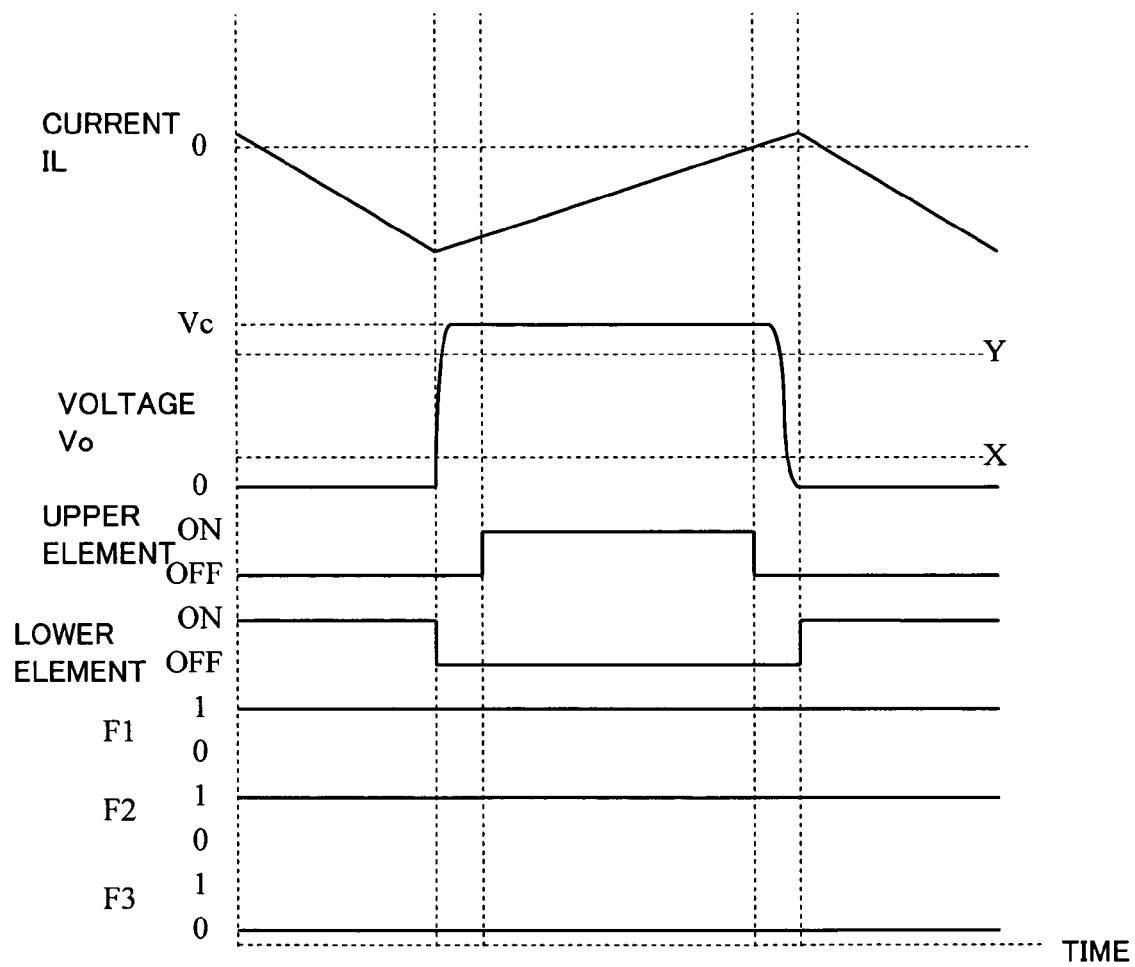
FIG. 22 is a diagram showing a waveform 1 at a low negative current.

FIG. 22 shows a waveform 1 at a low negative current. The voltage Vo reaches the threshold Y when the upper switching element 18 is turned ON, and therefore the values for F1, F2, and F3 become F1=1, F2=0, and F3=1.

Figure 23:
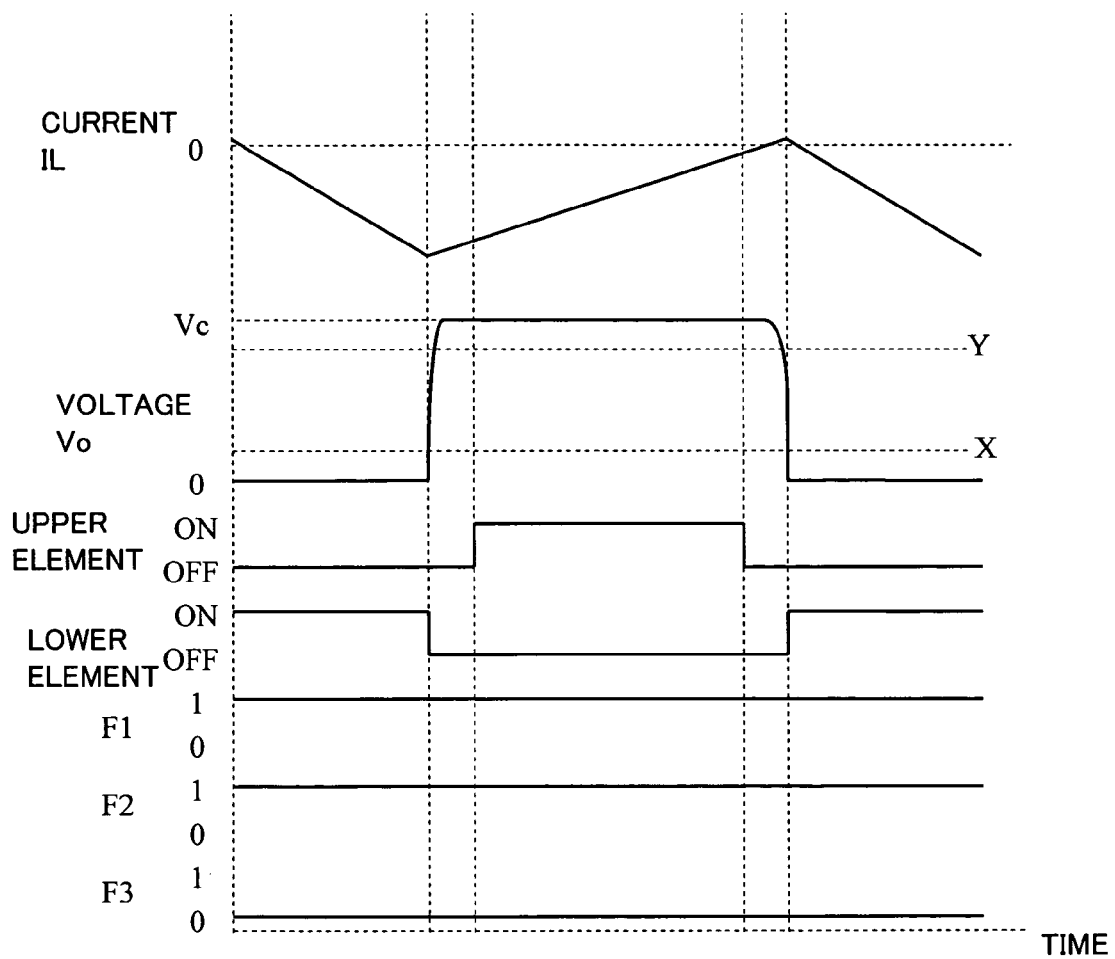
FIG. 23 is a diagram showing a waveform 2 at a low negative current.
Figure 24:
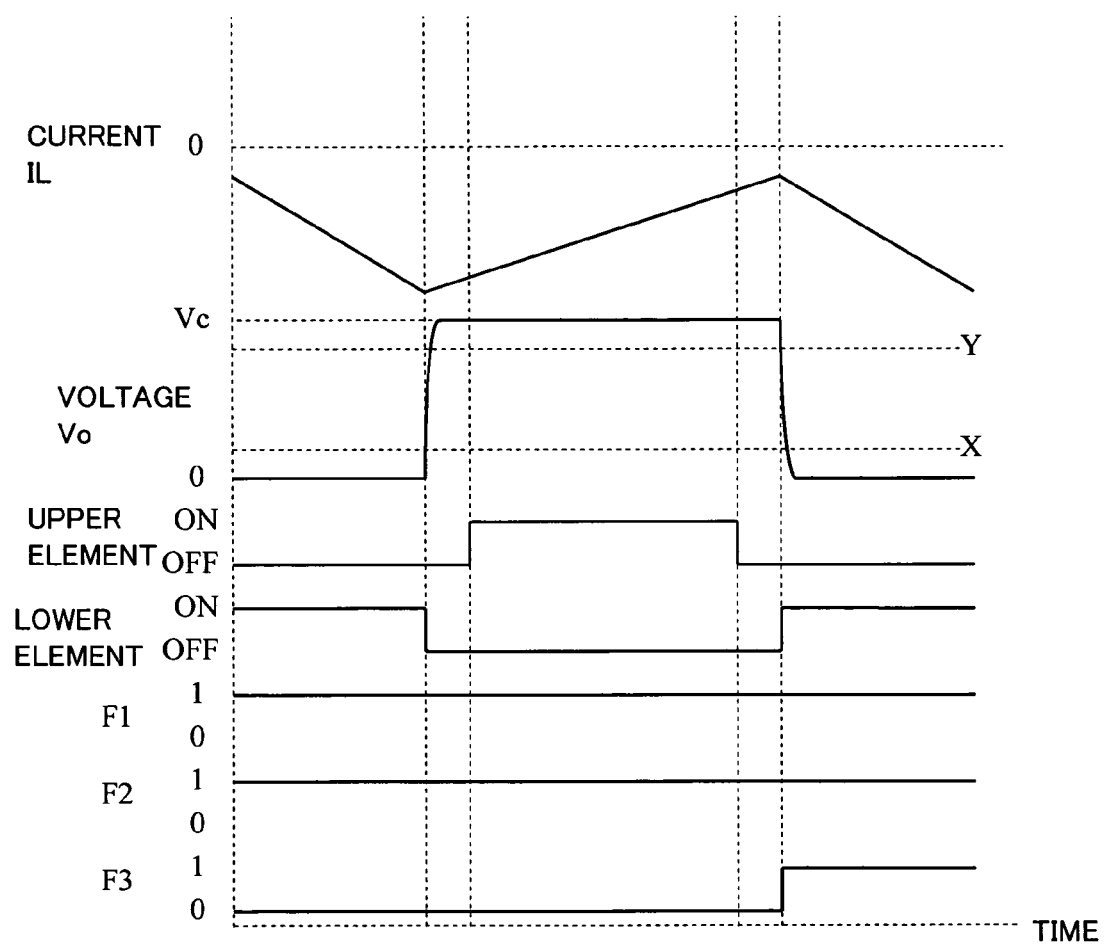
FIG. 24 is a diagram showing a waveform at a high negative current.

FIG. 23 shows a waveform 2 at a low negative current. The voltage Vo reaches the threshold Y when the upper switching element 18 is turned ON, and therefore the values for F1, F2, and F3 become F1=1, F2=0, and F3=1. Then, in also FIG. 24 in which a negative current becomes larger, and F3 becomes 1.

Therefore, as shown in FIG. 17, F1, F2, and F3 become F1=0, F2=0, and F3=0 at the high positive current shown in FIG. 18; F1=1, F2=0, and F3=0 at the low positive current shown in FIG. 19 and FIG. 20; F1=1, F2=0, and F3=1 at the low negative current shown in FIG. 22 and FIG. 23; and F1=1, F2=1, and F3=1 at the high negative current shown in FIG. 24. In addition, F3 becomes 1 or 0 when the current approaches zero.

As described, according to the present embodiment, four states of the current can be determined. Therefore, it is possible to effect control such that a control voltage is increased by a small predetermined amount of voltage at the low positive current, and the control voltage is decreased by a small predetermined amount of voltage at the low negative current. Furthermore, it is also preferable to add a process such as, for example, a change in control voltage is inhibited as long as the same state does not continue for a certain period (for example, consecutive 5 times detections).

Figure 4:
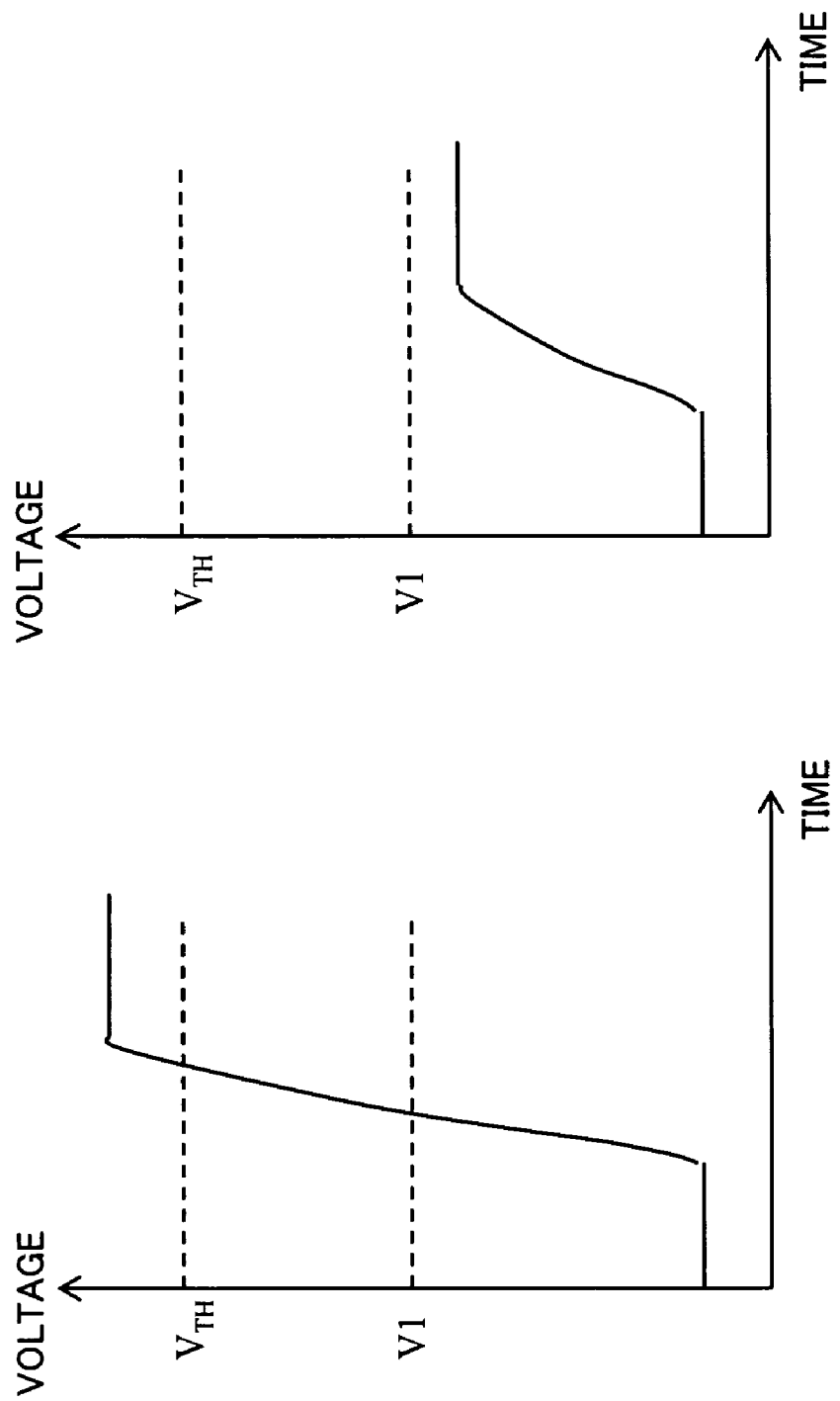
FIG. 4 is a diagram showing voltage comparison in a comparison example.

In this case, in FIG. 4, as disclosed in Patent Document 1, there is shown an example wherein a voltage $V_{TH}$ slightly lower than the maximum value of a voltage at the output end and a voltage of ½ of the maximum value are adopted as thresholds. When the voltage at the output end is predetermined voltage and the voltage at the output end is largely changed, as shown by in the left-hand side of FIG. 4, even when $V_{TH}$ and V1 are adopted as the thresholds, it is possible to detect that the voltage at the output end passes the thresholds. On the other hand, when an input voltage is lowered and the change in the voltage at the output end becomes small, as shown on the right of FIG. 4, it is not possible to detect that the voltage at the output end passes the thresholds even when $V_{TH}$ and V1 are adopted as the threshold values.

Figure 5:
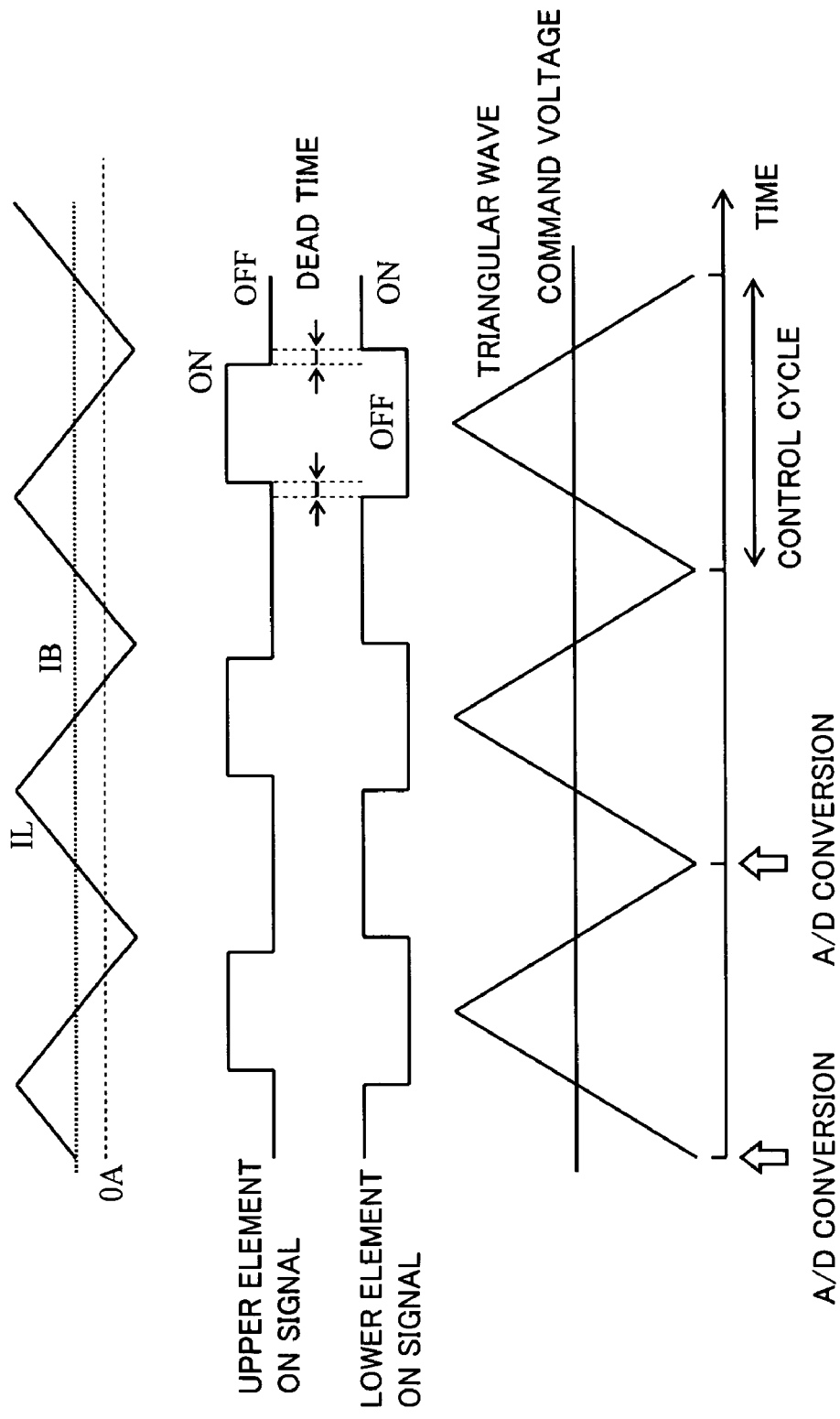
FIG. 5 is a diagram for explaining the operation of current detection in the comparison example.

Furthermore, in FIG. 5, as disclosed in Patent Document 2, there is shown an example in which a current at the output end is detected. As shown, in the PWM control, the triangular wave is compared with the command voltage, and the lower switching element is turned OFF when the triangular wave exceeds the command voltage. On the other hand, although the upper switching element is turned ON during this period, the turning ON of the upper switching element is postponed for the dead time to the turning OFF of the lower switching element, and the turning OFF of the upper switching element is accelerated for the dead time to the turning ON of the lower switching element. Therefore, periods of the turning OFF are generated in both the upper switching element and the lower switching element.

Then, if the current IL is A/D converted at the lowermost point of the triangular wave, the current IL of the moment corresponds to the fundamental wave component IB, and consequently, the fundamental wave component IB is supposed to be detected.

However, the current necessary for compensating for the dead time is a current value during switching. Because, when current ripple is large, the current in switching is not IL=IB, a current direction cannot be correctly detected.

Figure 25:
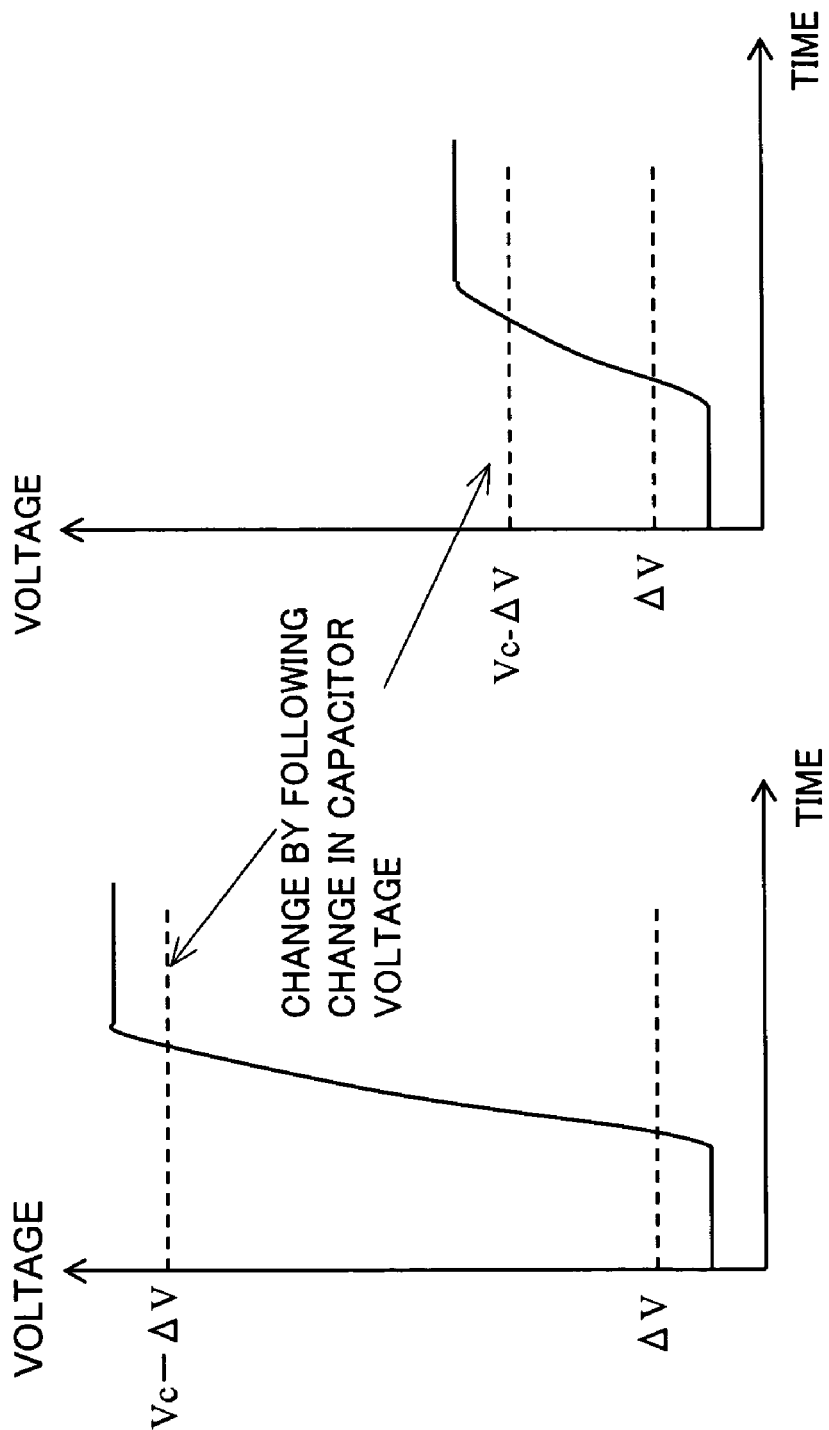
FIG. 25 is a diagram of an embodiment of the present invention for us in demonstrating that a proper determination is made even when a voltage Vc is changed.

On the other hand, according to the present embodiment, as shown in FIG. 25, two voltages of (Vc−ΔV) and ΔV are used as voltages to be compared with the voltage Vo. Therefore, voltage comparison can be properly performed even if the voltage Vc is changed.

The invention claimed is:

1. A power conversion circuit in which two switching elements connected in series between an upper line of a high voltage and a lower line of a low voltage are provided; free wheel diodes connected reversely parallel to said respective switching elements are provided; said switching elements are turned ON and OFF; a dead time is set such that said switching elements connected in series are not turned ON at the same time; and an output is fetched from a midpoint of said two switching elements, said power conversion circuit comprising:

a voltage sensor in which a voltage Vo of said midpoint a, a voltage Vc between said upper and lower lines, and a predetermined threshold voltage ΔV are input; and a state of Vo is determined by the values of Vo−ΔV and Vo−(Vc−ΔV), and the dead time of a command which is for controlling switching of said switching elements being compensated based on the results of the determination by said voltage sensor.

2. The power conversion circuit according to claim 1, wherein said voltage sensor includes:
a first comparator in which Vo and ΔV are input and compared;
a subtractor which uses an operational amplifier in which Vc and ΔV are input and a difference between these voltages is output; and
a second comparator in which the output of said subtractor and Vo are input and compared.

3. The power conversion circuit according to claim 2, wherein said voltage sensor includes:
a first flip-flop which obtains the results of the comparison performed by said first comparator; and
a second flip-flop which obtains the results of the comparison performed by said second comparator,
said first flip-flop and said second flip-flop produce outputs which are output as detection results.

4. The power conversion circuit according to claim 3, wherein said first flip-flop obtains the results of the comparison performed by said first comparator at a timing at which said switching element of the upper power supply line side is turned ON; and
said second flip-flop obtains the results of the comparison performed by said second comparator at a timing at which said switching element of the lower power supply line side is turned ON.

5. The power conversion circuit according to claim 4, wherein said voltage sensor further includes:
a third flip-flop which obtains the results of the comparison performed by said first comparator at a timing at which said switching element of the lower power supply line side is turned ON,
said first to third flip-flops produce outputs which are output as detection results.

6. The power conversion circuit according to claim 1, wherein the voltages Vo and Vc are voltages reduced in voltage by resistance-dividing by the same voltage division ratio.

* * * * *